June 7, 1927.  
J. ROBINSON  
1,631,552  
AUTOMATIC TRAIN PIPE CONNECTER  
Original Filed April 14, 1921   2 Sheets-Sheet 2
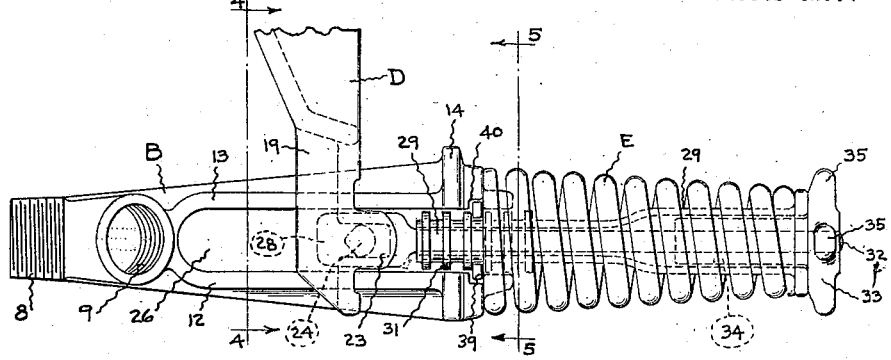
Fig. 2
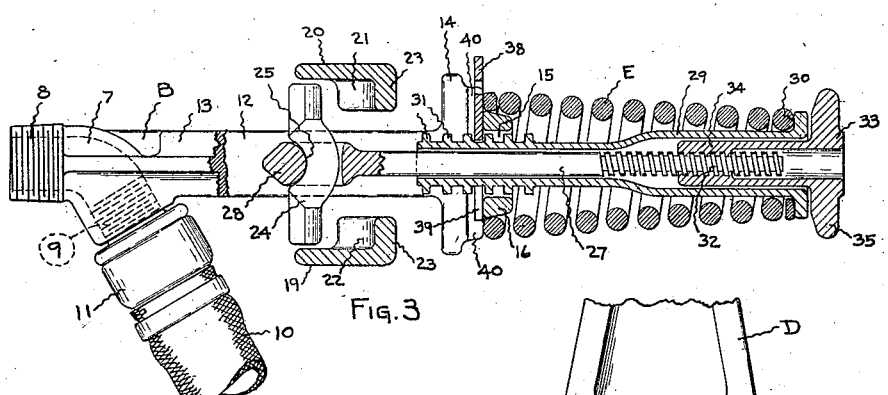
Fig. 3
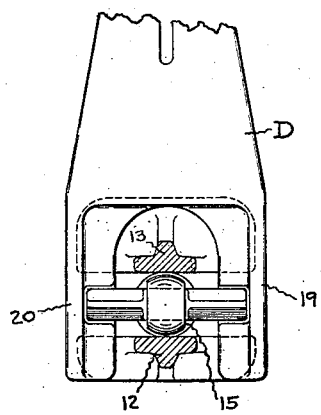
Fig. 4
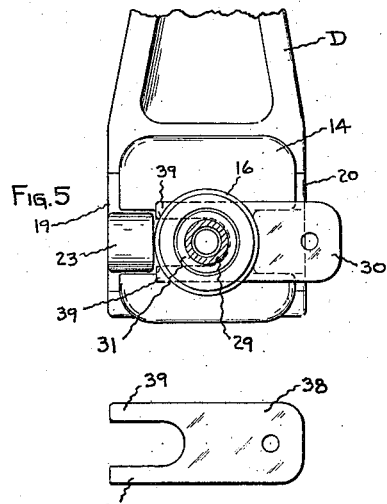
Fig. 5
Fig. 6
INVENTOR  
Joseph Robinson  
BY  
Watson, Cort, Morse and Grindle  
ATTORNEYS Patented June 7, 1927.

1,631,552

UNITED STATES PATENT OFFICE.

JOSEPH ROBINSON, OF NEW YORK, N. Y.

AUTOMATIC TRAIN-PIPE CONNECTER.

Application filed April 14, 1921, Serial No. 461,298. Renewed November 3, 1925.

My invention relates to automatic train pipe connecters and has among its objects to provide a simple and efficient means for replacing defective gaskets between the faces of mated connecter heads while the cars equipped therewith remain coupled. Another object is to provide means to permit the connecter head and buffer spring to be removed from the bracket of the automatic connecter while the cars remain coupled and without disassembling the spring with respect to the head.

I attain these objects by, and my invention resides in, the combinations, arrangements and constructions hereinafter described, pointed out in the appended claims, and illustrated in the accompanying drawings of which:

Figure 2 is a side elevation thereof with the coupling head omitted. In this view the buffer spring is shown in the compressed position with the key for locking it in such position, in place.

Figure 1:
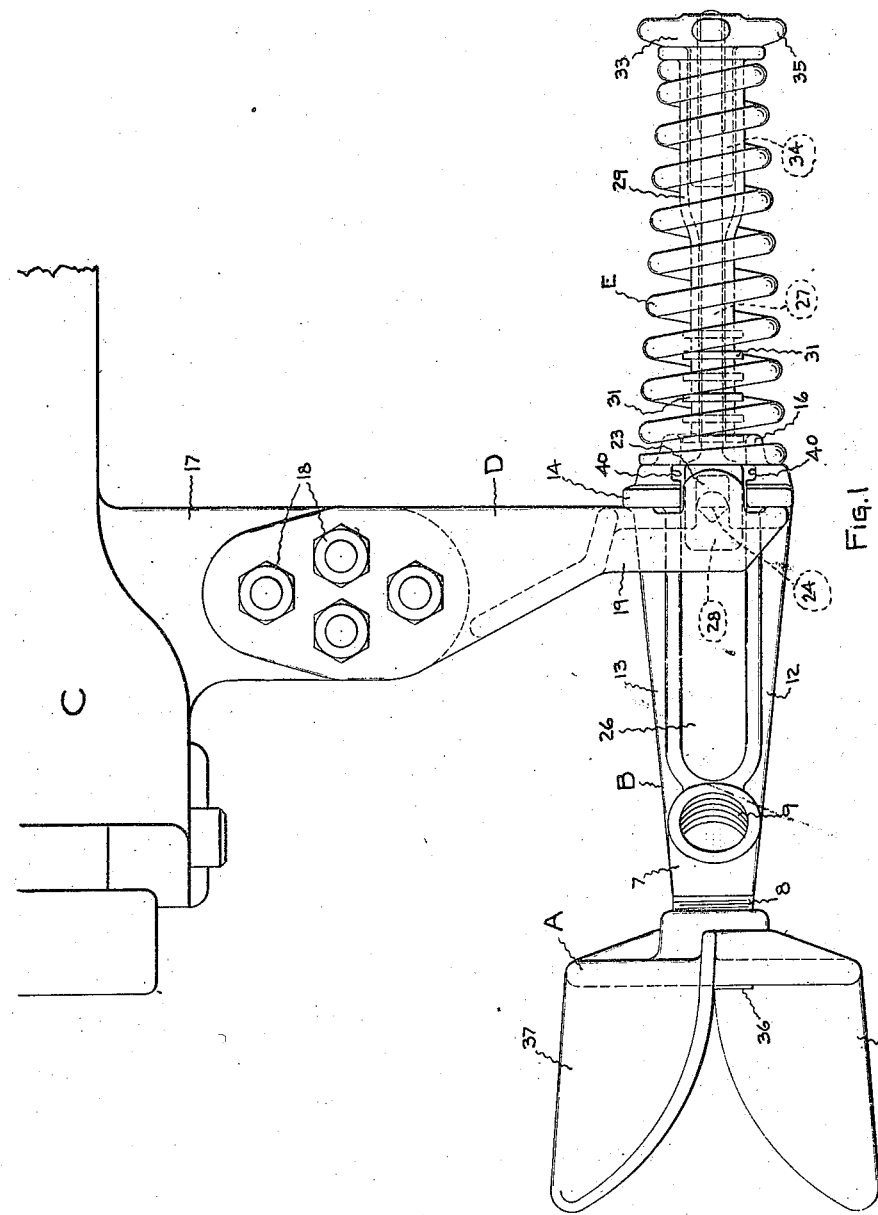
Figure 1 is a side elevation of an automatic connecter provided with my improvement.

Figure 3 is a sectional plan view of my improved connecter showing the buffer spring in the compressed position and the key aforesaid in place. In this view the tie rod and pivot bar are shown in the position they occupy when the connecter is ready to be removed from the bracket. The coupling head is omitted in this view.

Figure 4 is a sectional elevation on the line 4—4 of Figure 2.

Figure 5 is a rear view on the line 5—5 of Figure 2. In this view the buffer spring and coupling head are omitted. The key hereinafter described is shown in place, and Figure 6 is a side elevation of the key used with my improvement.

Suitably connected to any desired form of coupling head A I provide a pipe or body member B which I preferably form with a laterally diverging nipple or conduit 7 at its forward end, the nipple being threaded at 8 to receive the coupling head A and at 9 to receive the usual train pipe hose 10, Figure 3, as by a suitable fitting or union 11. Extending rearwardly from, and preferably formed integral with, the nipple 7 I provide the body B with a pair of horizontally disposed straps or members 12 and 13 spaced apart one above the other as shown. At the rear end the straps are suitably attached to or terminate in a vertically extending flange or projection 14 perforated at 15—Figure 4—and having an annular seat 16 for a spring. Attached to the usual lug 17 of the coupler C, as by bolts 18, I provide a bracket D the lower end of which terminates in vertically extending prongs or side walls 19 and 20 forming a fork which spans or embraces the body or pipe B, as shown especially in Figure 4. Each of the prongs is provided with a bearing 21 and 22 formed in a rearwardly extending projection 23 which leads away from the rear face of each of the prongs and into an opening at either side of the flange 14 as shown especially in Figures 1, 3 and 5. This arrangement prevents excessive rotation of the coupling head A about its longitudinal axis, the flange 14 being held, by the spring hereinafter described, normally in engagement with the rear side of the bracket D with its projection 23 resting in the opening in the flange as aforesaid. A pivot bar 24, having midway its end a seat 25, is pivotally mounted in the bearings 21 and 22 and extends through the opening 26 between the straps 12 and 13. Extending from the rear of the flange 14 through the perforation 15 therein I provide a tie rod or pivot device 27 having at its forward end a perforated head 28 through which the pivot bar or block 24 extends and with which it is pivotally connected, as shown especially in Figures 3 and 4. A sleeve or tubular member 29 having an annular seat 30 loosely fits over the tie rod 27 and passes through the perforation 15 in the flange 14, the flange being adapted to slide relatively to this sleeve. At its forward end the sleeve is provided with a plurality of circumferential flanges 31 spaced preferably about three-eighths of an inch apart. Between the annular seats 16 and 30 of the flange 14 and the sleeve 29, respectively, and seated thereon, I provide a suitably formed buffer spring E, and upon the rear threaded end 32 of the tie rod I threadingly mount a nut or abutment 33 having an elongated hollow internally threaded shank 34 lying within the enlarged cylindrically formed rear end of the sleeve 29, as shown. The nut forms an adjustable abutment for the sleeve and the spring E, and is provided with wings 35 adapted to be struck with a hammer or similar instrument to adjust the nut along the tie rod 27 to vary the compression of the spring E or to entirely relieve such compression, as desired. The spring serves to project the coupling head and yieldingly maintain it at the limit of its forward movement with the flange 14 normally engaging the rear face of the bracket D. In this manner the coupling head is yieldingly sustained in the normal coupling position and is placed, with its gasket 36, under the desired pressure when mating connecters couple up in service.

In operation the wings 37 of the coupling head A serve to align the opposing heads and bring their respective gaskets 36 into register. Further movement of the coupling head will compress the spring E shifting the body B rearwardly along sleeve 29 and the tie rod 27, and carry the flange 14 away from the rear face of the bracket. This movement releases the universal joint formed by the bearings 21 and 22 in the bracket, and by the pivot bar 24 and its pivotal connection with the head 28 of the tie rod 27, whereupon the mating connecters may move universally with respect to their brackets. When it is desired to remove a defective gasket 36 from mated coupling heads A without first uncoupling the cars, a pin or key 38, or other suitable device, is inserted into the body B at the rear end thereof and between two of the flanges 31. The key is provided with prongs 39 adapted to straddle the sleeve 29 and lie between the flanges 31 and against the inner face of the seat 16 of the body B, as shown particularly in Figures 2, 3 and 4, the body being provided with a groove or recess 40 to receive the prongs. The nut or abutment 33 is then backed off by striking the wings 35 thereof, or by applying a wrench thereto, until the retractive action of the spring E is arrested by contact of the key 38 with the inner face of the seat 16 as aforesaid. The nut is then backed off the tie rod 27 a further extent sufficient to permit the tie rod to be shoved forward in the sleeve 29 until its perforated head 28 and the pivot bar 24 occupy the position shown in Figure 3 whereupon the entire connecter may be dropped from the bracket D, the defective bracket replaced, and the connecter re-applied by retracing these operations. The construction comprehends means by which the spring E is anchored to the pipe or body B and by which the tie rod 27, the sleeve 29, and the nut 33 are retained in assembled relation during removal of the connecter from the bracket D and its replacement thereon.

In event the key 38 becomes lost and a substitute therefor is not available, the removal of a defective gasket is accomplished by relieving the spring E on the mated connecters of its compression by backing the nut 33 rearwardly on the threaded portion of the tie rod 27. In this manner the tie rod is relieved of tension and may be shifted forward as above described, and its head 28 and the pivot bar 24 disconnected from the bracket D. The reverse of this operation will reassemble these parts. It will be observed that the resistance of the spring E maintains the pivot bar 24 in its bearings 21 and 22, and the tie rod 27 in its seat 25 on the pivot bar.

What I claim is:

1. In an automatic train pipe connecter, the combination with a car coupler, of a coupling head and a support for suspending the head from said coupler, said support comprising a bracket and a spring, and means to permit said coupling head to be disconnected from a mating head while said coupler remains coupled to a companion coupler, said means comprising a member extending from the rear of said head through said bracket and carrying a perforated projection, a device extending into said perforation and having abutting relation to said spring, and means to anchor said device to said member to maintain said spring under compression while effecting such disconnection.

2. In an automatic train pipe connecter, the combination of a coupling head, a support therefor comprising a bracket and a spring, and means to permit said head to be disconnected from a mating head while the cars remain coupled, said means comprising a member extending from said head through said bracket and provided with an opening, a universal joint lying within said opening and supported on said bracket, a device extending from said bracket through said spring, a part adjustably mounted on said device and having abutting relation to the spring, and means to anchor said part to said member to free said device of the pressure of said spring.

3. In an automatic train pipe connecter, the combination with a coupling head, of a bracket and a spring suspending the head from a car, and means to permit said head to be disconnected from a mating head while the cars remain coupled, said means comprising a member extending from said head past said bracket into engagement with said spring, a universal joint pivotally mounted on said bracket on opposite sides of said member and comprising a device which extends into said spring, and means engaging said device and said member to lock said spring under compression whereby said bracket is freed from the pressure of said spring, for the purpose described.

4. In an automatic train pipe connecter, the combination of a coupling head, a support for suspending the head from a car, said support comprising a spring and a bracket forked at its lower end, and means to permit said head to be disconnected from a mating head while the cars remain coupled, said means comprising a member extending from said head into the fork of said bracket and provided with an opening, a pivot device supported in the fork of said bracket, an abutment for said spring, and means for anchoring said abutment to said member to relieve said device of the pressure of said spring.

5. In an automatic train pipe connecter, the combination of a coupling head provided with a rearwardly extending member having an opening therethrough, a bracket for suspending said head from the car coupler, said bracket having a forked portion which spans said member, a spring supported on said member, and means to permit said head to be disconnected from a mating head while the cars remain coupled, said means comprising a device pivotally supported by the forked portion of said bracket and extending into said spring, a part projecting into the opening in said member, and means to anchor said part to said member to arrest the retractive action of said spring while effecting such disconnection.

6. In an automatic train pipe connecter, the combination with a car coupler, of a coupling head and a support for suspending the head from said coupler, said support comprising a spring and a bracket having an opening therethrough, a member extending from said head through the opening in said bracket and having a radially extending projection, a device pivotally supported on said bracket on opposite sides of the opening therein, a spring surrounding said device and engaging said member, a sleeve extending into the spring and said member and having supporting relation to the spring, a projection on said sleeve, and means engaging said projection to anchor the sleeve to said member to relieve said device of the pressure of said spring, for the purpose described.

7. In an automatic train pipe connecter, the combination of a coupling head, a support therefor comprising a bracket and a spring, a perforated member extending from said head through said bracket into engagement with said spring, a device extending into the perforation in said member and pivotally supported on said bracket, an abutment for said spring extending into said perforation and surrounding said device, and means to anchor the abutment to said member to arrest the retractive action of said spring whereby said pivot device may be disconnected from said bracket.

8. In an automatic train pipe connecter, the combination of a coupling head, a bracket having an opening at its lower end, a member extending from said head through said opening and having a projection, a spring for extending said head with said projection normally engaging the rear side of said bracket, means for anchoring said spring to said bracket comprising a plurality of members pivotally supported on the bracket, and means for arresting the retractive action of said spring to permit said members to be removed from said bracket.

9. In an automatic train pipe connecter, the combination of a coupling head, a support therefor comprising a bracket having an opening therethrough, a member extending from said head through said opening, means for permitting universal movement to said head comprising a plurality of members pivotally supported on said bracket, a spring for extending said head and member, said spring being normally under compression, an anchor device engaging said member and along which the member is adapted normally to move against the resistance of said spring, and means to prevent said member moving along said anchor device whereby the member may be removed from said bracket with said spring under compression.

10. In an automatic train pipe connecter, the combination of a coupling head, a perforated member extending rearwardly from said head and provided with a projection, a bracket having a forked lower end spanning said member and provided with oppositely disposed bearings, a pivot block extending through said perforation into said bearings, a device pivotally mounted on said pivot block and extending to the rear of said projection, an abutment adjustably mounted upon the rear end of said device, a spring between said abutment and said member for projecting said coupling head with said projection normally engaging said bracket, a part abutting said spring and extending into the perforation in said member, and means co-operating with said part to arrest the retractive action of said spring.

11. In an automatic train pipe connecter, the combination of a coupling head, a member extending rearwardly therefrom and having a projection, a bracket embracing said member and against which said projection is adapted normally to rest, a spring seated on the rear end of said member and acting to extend the member and said head, a device pivotally supported on said bracket and projecting from within said member rearwardly past said projection, a sleeve surrounding said device and anchored to one end of said spring, said sleeve being provided with a flanged end extending into said member, and means engaging said flanged end and said member to arrest the retractive action of said spring.

12. In an automatic train pipe connecter, the combination of a coupling head, a member extending rearwardly therefrom, a bracket spanning said member, a spring seated at its forward end on said member, a part extending into said spring and having a shoulder engaging the rear end of said spring, said part being provided with a flanged forward end extending into said member, means to lock said flanged end to the member, a device pivotally supported on said bracket and extending rearwardly therefrom into said part and said spring, and an abutment engaging said part and co-operating with said device to anchor said spring to said bracket, said abutment being threadingly connected to said device.

13. In an automatic train pipe connecter, the combination of a coupling head, a member extending rearwardly therefrom and having a perforated projection, a bracket spanning said member and against which said projection is adapted normally to rest, a tie rod pivotally supported on said bracket for permitting universal movement to said head, a sleeve surrounding said tie rod and having a radially extending flange lying in said perforation, and a device inserted between said flange and said member to lock the spring to the member for the purpose described.

14. In an automatic train pipe connecter, the combination of a coupling head, a member extending rearwardly therefrom, a bracket embracing said member and having a bearing, a device pivotally supported on said bearing, an abutment connected with said device, a spring confined between said abutment and said member and for supporting said head and for maintaining said device in said bearing, and means for arresting the retractive action of said spring to permit said device to be extracted from said bearing.

15. In an automatic train pipe connecter, the combination of a coupling head, a member extending rearwardly therefrom and provided with a seat, a bracket spanning said member, a tubular device extending into said member from the rear thereof and having a shoulder, a spring interposed between said seat and said shoulder and surrounding said tubular device, means to permit universal movement to said coupling head, said means comprising a part pivotally supported on said bracket and extending into said tubular device and means co-operating with said tubular device to lock said spring to said member to permit said member to be dropped from said bracket without removing said part from said tubular device.

16. In an automatic train pipe connecter, a bracket, a coupling head, a member secured to said head and extending rearwardly past said bracket, a flange on said member, a tie rod pivotally connected to said bracket and extending rearwardly thereof, a spring surrounding said tie rod and normally pressing against said flange to force the same toward said bracket, and means associated with said tie rod for relieving the pressure of said spring against said flange while maintaining the spring under compression.

17. In an automatic train pipe connecter, a bracket, a coupling head, a member secured to said head and extending rearwardly past said bracket, a flange on said member, a tie rod pivotally connected to said bracket, and extending rearwardly thereof, a coiled spring surrounding said tie rod and normally pressing at one end against said flange, said tie rod serving normally to resist the rearward thrust of said spring, and means associated with said tie rod for relieving said tie rod from the thrust of said spring while maintaining the spring under compression.

18. In an automatic train pipe connecter, a bracket, a coupling head, a member secured to said head and extending rearwardly past said bracket, a flange on said member, a tie rod pivotally connected to said bracket, and extending rearwardly thereof, a coiled spring surrounding said tie rod and normally pressing at one end against said flange, said tie rod serving normally to resist the rearward thrust of said spring, and means associated with said tie rod for relieving said tie rod and said flange from the thrust of said spring while maintaining the spring under compression.

In testimony whereof I hereunto affix my signature.

JOSEPH ROBINSON.